Sept. 27, 1932.  A. W. MORTON  1,879,855
PISTON ROD PACKING
Filed Aug. 23, 1929  3 Sheets-Sheet 3
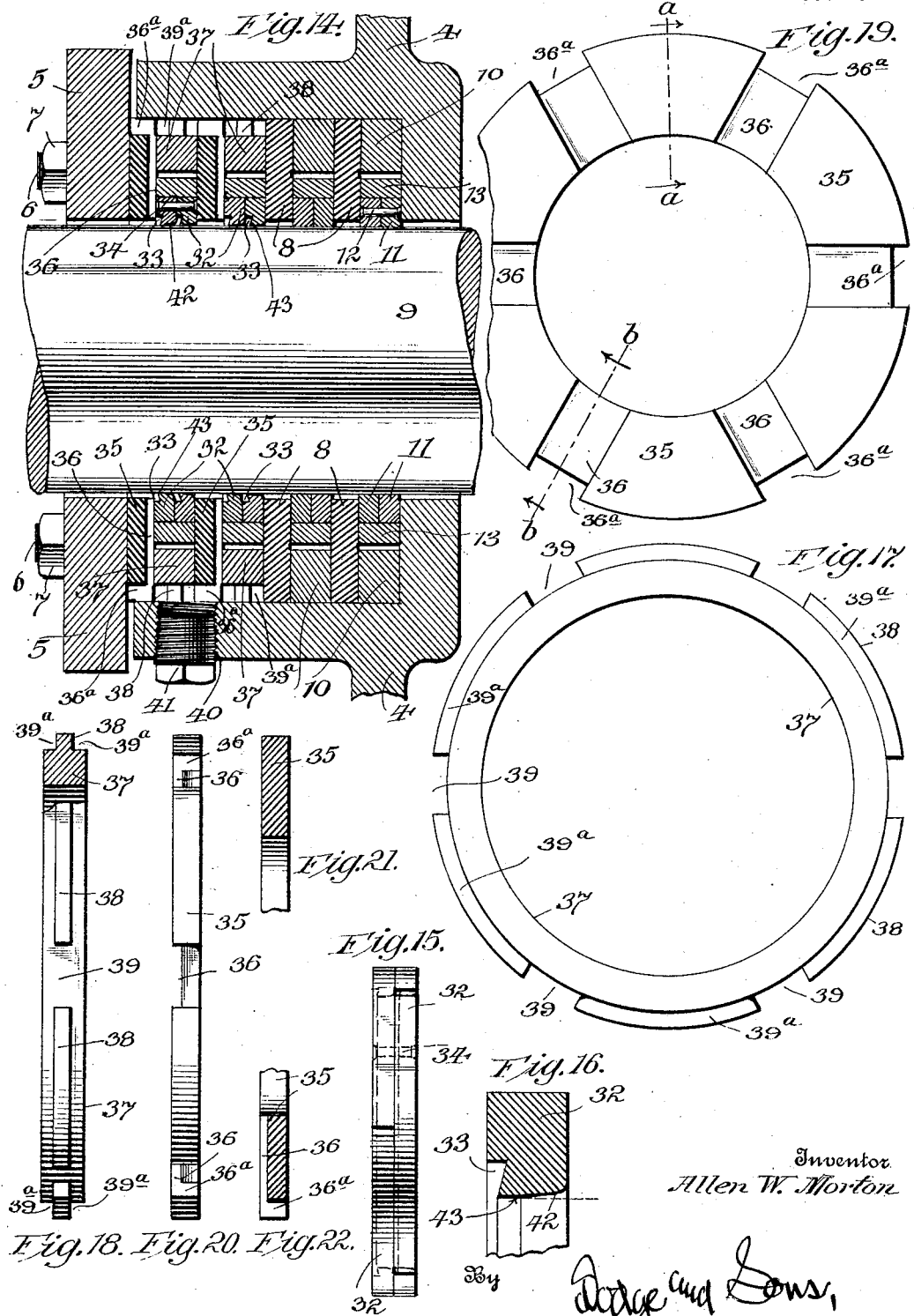
Inventor
Allen W. Morton Patented Sept. 27, 1932

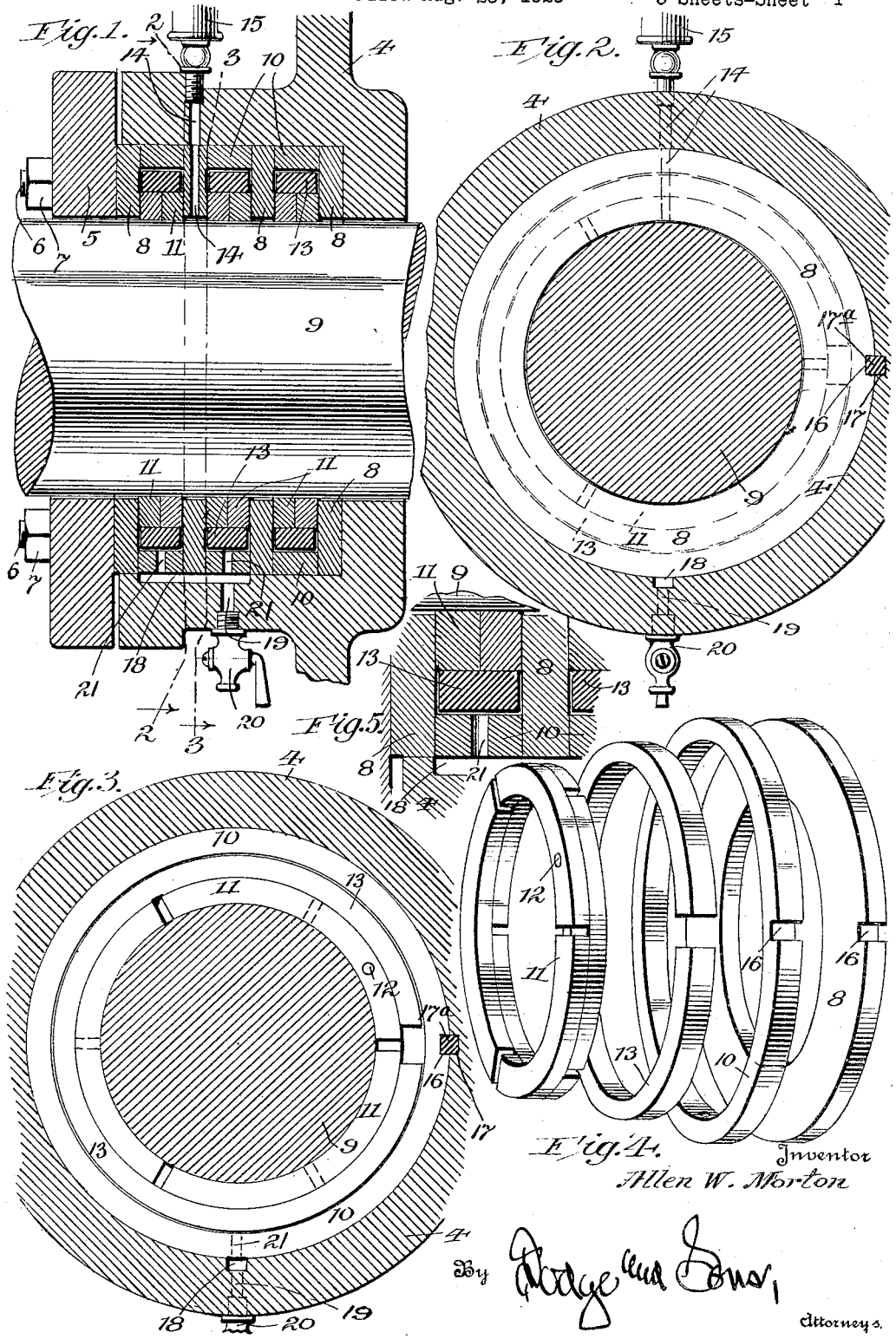

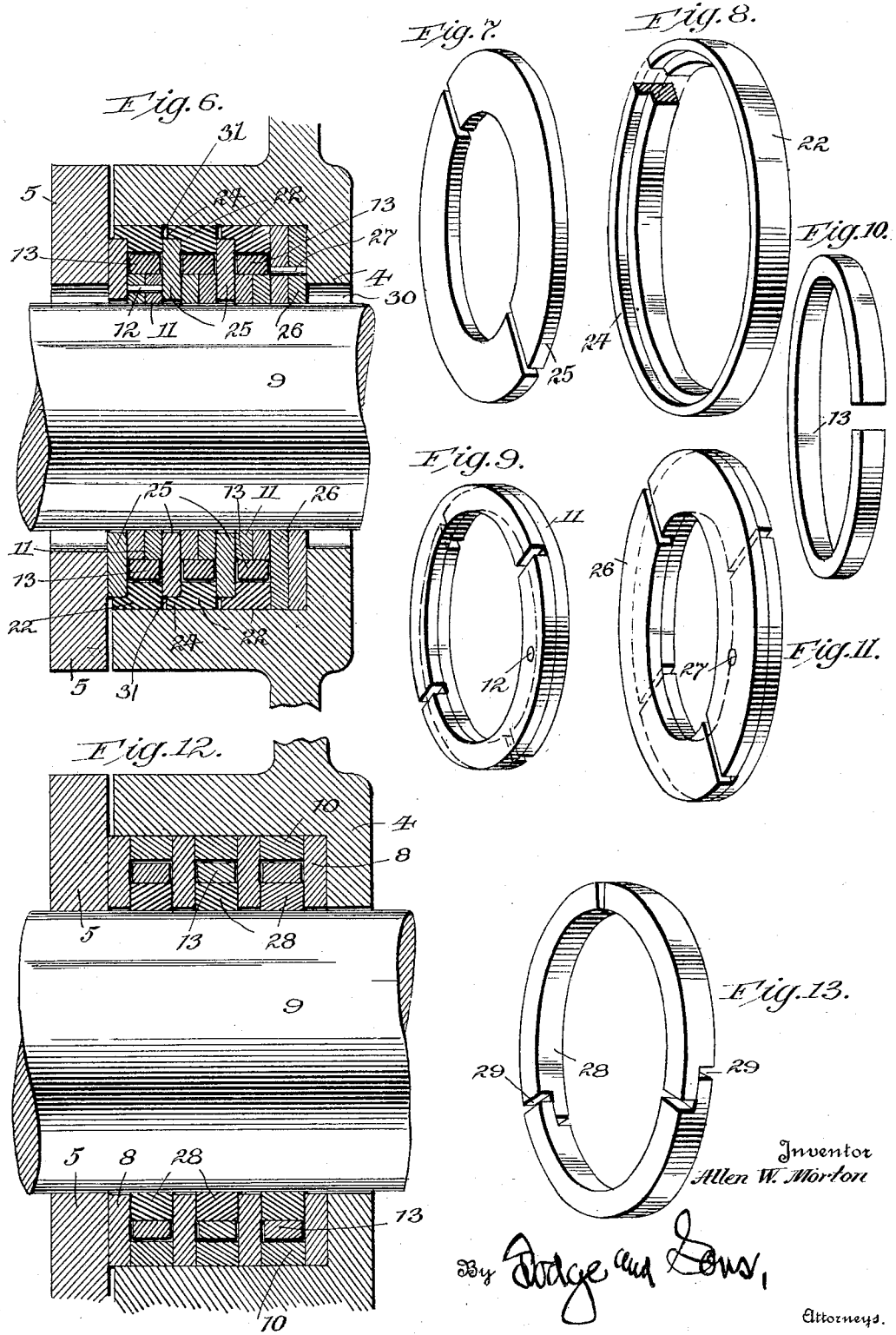

1,879,855

UNITED STATES PATENT OFFICE

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND

PISTON ROD PACKING

Application filed August 23, 1929. Serial No. 387,981.

My invention relates to piston rod packings and particularly to packings of the metallic type made up of several cooperating rings. Rings of this type are employed for packing the piston rods of steam locomotives, gas engines, compressors, and other piston rods which in use are subjected to very heavy loads and are required to withstand high fluid pressures without material leakage.

One of the objects of my invention is the provision of a packing which will produce a tight seal without subjecting the piston rod to rapid wear caused by excessive pressure on the rod.

Another object is to produce a packing which is easily assembled and will closely engage the piston rod and maintain a tight seal even after being subjected to long continued use.

A further object is to provide a packing capable of conforming to slight irregularities in the piston rod without leakage, and having rings which are full floating to allow for misalignment.

Another object is to provide a packing which will not only perform the functions set forth above, but will also prevent the passage of oil along the piston rod and provide for draining the excess oil out of the packing.

Other objects will appear from the following description when taken in conjunction with the accompanying drawings in which, Fig. 1 is a sectional view of one form of packing embodying my invention, Fig. 2 is a section on line 2—2 of Fig. 1, Fig. 3 is a section on line 3—3 of Fig. 1, Fig. 4 is a perspective view of the rings used in my packing, and disclosing the manner of assembling these rings, Fig. 5 is a detailed enlarged cross section of a portion of the packing illustrating the relation of the parts when assembled, Fig. 6 is a sectional view of a slightly modified form of packing, as specially embodied for use in steam locomotives, Figs. 7 to 11 are detail views of the various rings employed in the packing shown in Fig. 6, Fig. 12 is a further modified form of packing, Fig. 13 is a detail view of one of the wearing rings employed in the type of packing shown in Fig. 12, Fig. 14 is a section of a modified form of packing containing oil-scraping rings, Fig. 15 is a view of one of the oil-scraping rings as it appears when assembled, Fig. 16 is a detail of an oil-scraping ring, Figs. 17 and 18 are views in elevation and section, respectively, of a spacer ring employed in connection with the packing shown in Fig. 14, Figs. 19 and 20 are front and edge views in elevation, respectively, of a separator ring employed in the packing shown in Fig. 14, and Figs. 21 and 22 are detail sections of the separator ring shown in Fig. 19, the sections being taken on lines $a$—$a$ and $b$—$b$, respectively, of Fig. 19.

Similar reference characters refer to similar parts in each of the several views.

Referring first to Fig. 1 the reference character 4 designates a stuffing box of conventional type. As here shown this box is circular in cross section and is provided with a cover plate 5 which may be secured to the open end of the box by suitable means such as studs 6 and nuts 7. When secured in position the cover plate 5 holds the structure tightly within the box 4. This plate encloses a packing made up of a plurality of annular one-piece separator rings 8 which fit closely within the box 4, but are spaced slightly from the periphery of a piston rod 9 associated with this box. Rings 8 are held in spaced relation to one another by means of circular spacer rings 10, these rings likewise being fitted closely to the inside wall of box 4. When the rings 8 and 10 are placed in position and the plate 5 is bolted on, an annular chamber is formed between each two adjacent separator rings. Mounted on the rod 9 within each of these chambers is a pair of multi-piece segmental wearing rings 11. As here shown the rings 11 are made in three pieces and are held together with their joints staggered by a pin 12. This pin prevents the joints in the rings from lining up and in case the pin should break, it is confined between two of the separator rings so as not to be able to score the piston rod or to damage the packing other than to allow a slight leakage, should the segments revolve and the joints align.

In order to cause the rings to seal tightly against the rod it is necessary that the wearing rings be held in close engagement with the piston rod, and at the same time be movable so as to conform to irregularities in this rod caused by uneven wearing or misalignment. For the purpose of obtaining this close engagement a split contracting ring 13 is provided and when placed in position embraces the peripheral surface of the wearing rings 11. These wearing rings are of such axial thickness as to enter the chamber between the associated separator rings with a sliding fit, and to prevent fluid pressure from escaping between their edges and the walls of the chamber, but not to produce objectionable friction. When these surfaces are covered with a thin film of oil, a satisfactory fluid-tight seal is obtained. The contracting rings 13 are of a width slightly less than that of spacer rings 10 so as to be in freely floating relation with respect to the separator rings which form the side walls of the chamber in which they are placed.

As a result of this arrangement the cover plate 5 may be bolted tightly into position so as to force the separator rings 8 and the spacer rings 10 into very close engagement, but yet not to interfere with the action of rings 11 and 13. When after long continued use the wearing rings 11 become worn away on the surface which engages rod 9, the contracting ring 13 will force them radially inward so that their joints come closer together and preserve a fluid-tight seal. This action will continue until the free ends of the wearing ring segments come together and permit no further adjustment. New wearing rings are easily and cheaply installed and the life of the packing is infinite except for replacement of wearing rings.

I have found by experiment that piston rod packings are often subject to rapid wear and that such wear is due largely to lack of proper lubrication. After considerable use, the oil which is supplied to the packing becomes emulsified and loses its lubricating qualities, or hardens so as to prevent new oil from reaching the wearing surfaces. Likewise, steam may at times enter the chambers between the rings and condense so as to further interfere with lubrication. To overcome these difficulties, I sometimes provide a small vertical passageway 14 (Figs. 1 and 2) through the top of box 4 and through one of the separator rings 8 by which lubricating oil may be supplied to the piston rod 9. In its reciprocating travel rod 9 will distribute the oil over the inner surfaces of the various wearing rings 11 and thereby materially reduce the wear. In the bottom of box 4, I construct a small longitudinal groove 18 having a passageway 19 and a pet cock 20 associated therewith. The spacer rings 10 are perforated at 21 in order to afford communication between the annular chambers surrounding the contracting rings 13, and the groove 18. This groove is shown as extending over only two of these chambers, but it is obvious that it may be extended further, if desired. By this arrangement any emulsified oil or water which collects within the annular chambers may be drained away through the pet cock 20 to make room for fresh lubricant supplied from the oil cup 15. The inner wall of box 4 has a cut-out slot 17 (Figs. 2 and 3) which is adapted to register with similar slots 16 in the outer wall of rings 8 and 10 and to admit a key 17a. When this key is in position it insures that the passageways 14 and 21 are aligned with the opening from oil cup 15 and the groove 18, respectively.

The slightly modified form of packing shown in Fig. 6 is similar to that already described except that in this embodiment I provide different types of spacer and separator rings, and also make use of an additional sealing ring contacting with the rear end of box 4. This construction is particularly adapted to use in steam locomotives, and for this reason the box 4 is shown with an enlarged opening 30 at its bottom end to permit the bosses on the piston rod to pass through the box during assembly. This construction facilitates assembly in that the rod may be inserted into the cylinder through this box and without removing the cylinder head.

In this form of the invention the separator rings 25 are made in two pieces as shown in Fig. 7, to facilitate assembly and do not contact with the inner peripheral wall of box 4. Spacer rings 22 used in this form are cut away on their inner surface so as to form annular projecting flanges 24 inside of which the two parts of separator ring 25 fit closely. The peripheral surfaces of rings 22 are adapted to form a close fit with the inside wall of box 4, but these peripheral surfaces are made of such width and the flanges 24 are so constructed that when the packing is assembled the edges of rings 22 are slightly spaced from one another at 31 as shown in Fig. 6. This construction insures that the separator rings 25 are tightly wedged in position, the inner surfaces of these rings being spaced from the piston rod 9 as before.

While the joints between wearing rings 11 are held in staggered relation by the pins 12, it is possible that some leakage may occur through the splits in separator rings 25. In order to avoid any such leakage I provide a pair of multi-piece sealing rings 26 (Fig. 11) the joints of which are held in staggered relation by a pin 27. These rings fit into the end of box 4 and contact with the spacer rings 22 on one side and with the end of box 4 on the other side. This additional set of sealing rings will make very remote the possibility of steam escaping through the opening 30 around piston rod 9 and getting around behind the wearing ring assembly. The cover plate 5 produces sufficient pressure against separator rings 25 and the counterbored surfaces of spacer rings 22 to cause the sealing rings 26 to abut tightly against the rear wall of box 4, thereby producing a leak-proof assembly and at the same time rendering still more improbable the escape of steam to the outer surface of the contracting rings. This prevents the possibility of steam acting on the wearing rings to increase their tension, which is the most common fault of existing packings. The staggering of the splits in rings 26 will avoid any possibility of steam escaping through them. In this embodiment the wearing rings 11, as well as the sealing rings 26 are illustrated as being made in two pieces but this is not essential as they may obviously be made in three pieces as shown in Fig. 4.

In some cases it may be desirable to produce a packing of greater rigidity and to construct it in a simple manner requiring a smaller number of parts. In such a case the arrangement shown in Fig. 12 is very suitable. This structure is similar to that shown in Fig. 1 but each chamber contains only one segmental wearing ring of substantially the same width as the contracting ring 13. The wearing rings 28 are preferably made in three pieces joined together by stepped joints 29 with the pieces overlapping to prevent leakage. The operation of the packing shown in Fig. 12 is substantially the same as that of the packings already described, and liquid draining means may be provided in the same manner.

When packings of this character are used in connection with internal combustion engines, it sometimes happens that oil is carried along the piston rod from the crank case until it reaches the combustion chamber where it combines with the engine fuel, causing an undue formation of carbon and lowering of the efficiency of the engine. The modified form of packing shown in Fig. 14 is similar to that shown in Fig. 1, except that special oil control rings are used to prevent the travel of oil along the piston rod. In addition to this a modified form of oil draining means is provided, and in order to have this means function satisfactorily it is necessary to make use of modified types of separator and spacer rings.

Referring now to Fig. 14, the stuffing box 4 together with the wearing rings 11, the contracting rings 13, the separator rings 8 and spacer rings 10 are similar to those already shown and described in connection with Fig. 1. The cover plate 5 is also secured in position in the same manner, but the remainder of the packing construction is particularly constructed for oil control. Associated with piston rod 9 for the purpose of preventing oil from being carried along this rod from left to right are a plurality of oil-scraping rings 32 (Figs. 15 and 16).

These rings are each constructed preferably in three pieces in the same manner as wearing rings 11, but are provided on one side with an under-cut groove 33 extending entirely therearound.

In addition to carrying the groove 33, each of the rings 32 has a beveled inner face 42, adjacent to the piston rod. This beveled face extends from the rod contacting portion 43 outwardly to a point remote from the rod. The rings 32 are held in staggered relation by a pin 34 which prevents the joints from lining up as heretofore. The pairs of oil-scraping rings 32 are placed in position on piston rod 9 with the grooves 33 facing to the left as seen in Fig. 14 or in a direction from which the oil travels along the rod so that as the piston rod moves to the right the oil carried by this rod is picked up by grooves 33 and collected in the chambers connected with these grooves. The beveled surface aids materially in this action, and on the return stroke spreads the remaining oil uniformly around the piston rod and tends to ride over excess oil. Single split contracting rings 13 are associated with the oil-scraping rings 32 in order to hold these rings in closely contacting relation with the piston rod 9.

The chambers which accommodate the oil-scraping rings 32 and the contracting rings 13 are defined by separator rings 35. These separator rings are of annular construction and are provided with radial cut-away portions 36 and 36a at spaced intervals. The portions between these openings 36 are of full thickness (Fig. 20) so as to form a support for the oil-scraping rings 32, the contracting rings 13 and spacer rings 37. The spacer rings 37 (Figs. 17 and 18) are also of annular form but carry on their peripheral surfaces narrow segmental fins 38 evenly spaced therearound and separated from each other by openings 39, and from the ring edges by channels 39a.

During the functioning of the oil-scraping rings 32 a considerable quantity of oil is removed from the piston rod and collects within the packing. It is, therefore, necessary to provide some place to which this oil may escape, because if the excess becomes too large, the scraping rings will not be able to take care of it. It is for this reason that the separator rings 35 are provided with cut-away portions, and the rings 37 with narrow segmental fins spaced from the edges of the rings. It will be clear from examination of Fig. 14 that the openings 36 and 36a in separator rings 35 together with spaces 39 and channels 39a on spacer rings 37 will provide substantial chambers in which oil may collect and flow freely from one space to another. Obviously the major portion of this oil will gravitate to the lower part of stuffing box 4 where it will collect and if means is not provided for removing it the excess may overflow from the packing. I provide for the removal of this excess oil by forming a threaded opening 40 in the bottom of box 4 and closing the same by a screw plug 41. Whenever an excess quantity of oil is collected, or the oil in the packing has become emulsified or devitalized the plug 41 may be removed and the packing drained ready to receive fresh oil. If the amount of oil supplied to the packing by the travel of the piston rod 9 is insufficient, an additional oiling means such as is shown in Fig. 1 may be added.

I have shown the packing in Fig. 14 as provided with two sets of oil-scraping rings but it is obvious that the number of these rings employed may be varied in accordance with varying conditions of operation, the number being so chosen that the oil-scraping action is sufficient to prevent excess oil from reaching the combustion chamber of the engine. This form of packing is particularly adapted for, though in no way limited to, use in connection with internal combustion engines. The embodiment of my invention shown in Fig. 14 has all the advantages which are set forth in connection with the embodiments described hereinbefore.

It will be obvious from the foregoing that my new form of packing is capable of producing a tight seal around a piston rod without causing excessive wear on this rod due to fluid under high pressure getting behind the packing and forcing it inwardly. At the same time the rings upon which the actual wear occurs are held in closely contacting relation with the piston rod, and the contracting rings are free to float and to cause the wearing rings to conform to irregularities on the surface of the rod, and to produce a tight seal even after long periods of use.

Although I have herein shown and described only a few forms of packings embodying my invention it is obvious that various changes may be made in the details within the scope of the appended claims without departing from the spirit and scope of my invention.

What is claimed is:

1. A metal packing comprising a stuffing box, a plurality of annular separator rings disposed in said box and having cut-away portions to form oil collecting chambers, spacer rings disposed between the separator rings, said spacer rings also having cut-away portions, at least one oil-control ring between certain of said separator rings, a contracting ring surrounding said oil-control ring, said contracting rings and said oil-control ring being freely floating with respect to said separator rings, and means for draining oil from the spaces around the rings.

2. A metal packing comprising a stuffing box, a plurality of annular separator rings disposed in spaced relation to one another within said box, and having cut-away portions, multi-piece wearing rings between said separator rings, at least one of said wearing rings having an oil collecting groove, said oil-collecting groove being in juxtaposition to the cut-way portions of the separator rings, and a single resilient contracting ring embracing said wearing ring in freely floating relation with respect to said separator rings.

3. A metal packing comprising a stuffing box, an annular separator ring in said box, said separator ring containing radial oil channels in one side face thereof, an oil control ring adjacent the separator ring, a contracting ring surrounding and cooperating with the oil control ring to force it inwardly, said oil control ring containing a groove in direct communication with the radial oil channels of said separator ring, means for spacing said separator ring from one wall of the stuffing box, and means for clamping said separator ring and said spacing means to the box.

In testimony whereof I have signed my name to this specification.

ALLEN W. MORTON.